(12) United States Patent
Wu

(10) Patent No.: US 8,605,574 B2
(45) Date of Patent: Dec. 10, 2013

(54) METHOD FOR UPDATING AN ADDRESS TABLE IN AN ETHERNET RING NETWORK NODE

(75) Inventor: Shaoyong Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 268 days.

(21) Appl. No.: 12/921,134

(22) PCT Filed: Jan. 5, 2009

(86) PCT No.: PCT/CN2009/070028
§ 371 (c)(1),
(2), (4) Date: Nov. 8, 2010

(87) PCT Pub. No.: WO2009/111955
PCT Pub. Date: Sep. 17, 2009

(65) Prior Publication Data
US 2011/0122762 A1 May 26, 2011

(30) Foreign Application Priority Data
Mar. 12, 2008 (CN) .......................... 2008 1 0007785

(51) Int. Cl.
*G01R 31/08* (2006.01)
(52) U.S. Cl.
USPC ............ 370/222; 370/221; 370/242; 370/406
(58) Field of Classification Search
None
See application file for complete search history.

(56) References Cited

U.S. PATENT DOCUMENTS

| 6,766,482 B1 * | 7/2004 | Yip et al. ...................... 714/717 |
| 7,944,815 B2 * | 5/2011 | Thomson et al. .............. 370/222 |
| 8,031,590 B2 * | 10/2011 | Long et al. .................... 370/225 |
| 2004/0223503 A1 * | 11/2004 | Lynch et al. .................. 370/404 |
| 2009/0147672 A1 * | 6/2009 | Chun et al. .................... 370/225 |
| 2009/0257348 A1 * | 10/2009 | Stokes et al. .................. 370/228 |
| 2009/0296569 A1 * | 12/2009 | Ramalho Ribeiro Dos Santos et al. ............................. 370/222 |
| 2011/0249552 A1 * | 10/2011 | Stokes et al. .................. 370/228 |

FOREIGN PATENT DOCUMENTS

| CN | 1909496 A | 2/2007 |
| CN | 101075934 A | 11/2007 |
| CN | 101163079 A | 4/2008 |
| EP | 1727313 A1 * | 11/2006 |
| WO | 2006/125544 A1 | 11/2006 |

OTHER PUBLICATIONS

P.R. China, State Intellectual Property Office, First Office Action for CN App. No. 200810007785.X, dated Mar. 3, 2011.

* cited by examiner

*Primary Examiner* — Donald Mills
(74) *Attorney, Agent, or Firm* — Bright IP Law Offices

(57) ABSTRACT

The present invention provides a method for updating an address table in an Ethernet ring network node and an Ethernet ring network node. When the Ethernet ring network node implements a port state switching operation and a port on the ring is switched from an unblocked state to a blocked state, the Ethernet ring network node updates its forwarding database. The method and the Ethernet ring network node of the present invention can accelerate update of the FDB in the node when a link fails or is recovered, thereby improving the convergence speed for the switching when the ring network fails.

14 Claims, 5 Drawing Sheets

METHOD FOR UPDATING AN ADDRESS TABLE IN AN ETHERNET RING NETWORK NODE

CROSS-REFERENCE TO RELATED APPLICATIONS

This application is a U.S. national phase application under the provisions of 35 U.S.C. §371 of International Patent Application No. PCT/CN09/70028 filed Jan. 5, 2009, which in turn claims priority of Chinese Patent Application No. 200810007785.x filed Mar. 12, 2008. The disclosures of such international patent application and Chinese priority patent application are hereby incorporated herein by reference in their respective entireties, for all purposes.

TECHNICAL FIELD

The present invention relates to data communication, and specifically, to a method for updating an address table in an Ethernet ring network node.

BACKGROUND ART

In the protection technologies for the Ethernet ring network, multiple nodes are connected to each other to constitute a ring, and a section of link on the ring is defined as a ring protection link. When the state of each link on the ring has no failure, the ring protection link is blocked and the service communication data between the nodes can not pass through the ring protection link, thereby preventing a "broadcast storm" caused by a closed ring, and any two nodes on the ring only have therebetween one path capable of communicating. In general, the port of a node being blocked means that the port can not forward service communication data when it is set blocked, and the port being unblocked means that the port can forward the service communication data when it is set unblocked, wherein whether the port is blocked or unblocked does not affect the forwarding of a protocol frame protected by an Ethernet ring, unless it is especially pointed out that the port blocks or unblocks the forwarding function of the protocol frame protected by the Ethernet ring. A link being blocked means that one of the two adjacent ports of the link is blocked or both of the two ports are blocked, and the service data can not be forwarded through one of the two adjacent ports of the link and thus the service data can not pass through the blocked link; and a link being unblocked means that both of the two adjacent ports of the link are unblocked, and thus the service data can be forwarded through the two adjacent ports of the link.

When a link on the ring fails, and if the failed link is not the ring protection link, the ring protection link is unblocked. Since the path of the service communication data is changed, the nodes on the ring need to update a FDB (Forwarding Database), and the service communication data between the nodes can pass through the ring protection link and is transmitted through the new path and thus is reconnected, and further a new FDB is learned and established. When the failed link on the ring is recovered, the ring protection link is re-blocked, the service communication data can not be transmitted via the ring protection link, the transmission path of the service communication data will also be changed and the nodes on the ring also need to update the FDB.

Taking RFC3619 as an example, one node on the ring is defined as a master node (MASTER) (the master node is also called as a ring protection link affiliation node), and the other nodes are defined as transit nodes (TRANSIT); the two ports on the ring of the mater node are respectively defined as a master port (P) and a slave port (S), and when the state of each link on the ring has no failure, the master node blocks the service communication data of the slave port. As shown in FIG. 1a, the node S2 is a master node, the other nodes are transit nodes; the port 2 of the node S2 is a master port and the port 1 is a slave port, and when the states of the links on the ring are in good condition, the master node S2 blocks the service communication data of the slave port 1, which means that the link between the nodes S2 and S4 is a ring protection link, thereby preventing a closed ring in the network, and user 1 and user 2 only have one communication path therebetween. When a link on the ring fails, the adjacent ports of the failing link notify the master node that a link on the ring fails, and the master node unblocks the slave port, updates the FDB, and notifies other nodes to update the FDB too, and after the other nodes update the FDB upon receiving the notification, the service communication between the nodes is transmitted according to the new path. As shown in FIG. 1b, the link between the node S3 and the node S4 fails, and the nodes S3 and S4 notify the master node S2 that the link on the ring fails, the master node unblocks the slave port, i.e., unblocks the ring protection link, updates the FDB and sends a protocol frame (Flush-Down) to notify other nodes to update the FDB; transmission is performed according to the new path after the nodes update the FDB, and the service data between the user 1 and the user 2 is reconnected. When the failed link on the ring is recovered, the slave port of the master node is re-blocked, the service communication data can not be transmitted via the slave port of the master node, and the transmission path of the service communication data will also be changed, the master node needs to update the FDB itself and also needs to notify the other nodes on the ring to update the FDB.

When an Ethernet ring network protection system conducts switching, the original path is changed, there is false MAC address egress port information in the FDB of the nodes, and thus the FDB needs to be updated so that the service data can be transmitted through a new path. Before the nodes update the FDB, there is a false table item in the FDB, and if a data frame finds a false egress port according to the FDB of the nodes, it can not reach the target node, and thus the data frame will be lost; after the nodes update the FDB, the original FDB table item on the nodes are cleared up, the data frame can not find the egress port corresponding to the target MAC address, then it is broadcasted to each port so as to reach the target node; when receiving the data frame, a node learn the MAC address in the frame and establishes a new FDB. In general, it is time consuming for a node to update the FDB, and before a new FDB is established, the broadcasting of the data frame can easily block the links so that the service data communication is interrupted for a long time and the nodes receive a lot of irrelevant frames which leads to a too heavy instantaneous burden of the whole system.

SUMMARY OF THE INVENTION

The present invention needs to solve a technical problem of providing a method for updating an address table in an Ethernet ring network node and an Ethernet ring network node to accelerate the update of the FDB when a link fails or is recovered, thereby improving the convergence speed for the switching when the ring network fails.

The technical problem of the present invention is solved by providing a method for updating an address table in an Ethernet ring network node, wherein when the Ethernet ring network node implements a port state switching operation and a port on the ring is switched from an unblocked state to a blocked state, the Ethernet ring network node updates its forwarding database.

Further, the forwarding database of the Ethernet ring network node is updated in the following manner: firstly clearing up a corresponding table item of the forwarding database, and then re-learning the address in the corresponding table item that has been cleared up.

Further, the corresponding table item is the table item of the whole forwarding database, or the table item of the forwarding database corresponding to the port on the ring, or the table item of the forwarding database corresponding to the port switched from the unblocked state to the blocked state.

Further, the reason why the port is switched from the unblocked state to the blocked state is that the port fails, at this time the Ethernet ring network node to which the failed port belongs implements the port state switching operation, switches the state of the failed port from the unblocked state to the blocked state and updates the forwarding database.

Further, the reason why the port is switched from the unblocked state to the blocked state is that the link fails, at this time two Ethernet ring network nodes directly connected with each other via the link implement the port state switching operation, the states of the ports on the ring corresponding to the two Ethernet ring network nodes are switched from the unblocked state to the blocked state and respectively update the forwarding database.

Further, the reason why the port is switched from the unblocked state to the blocked state is that a master node voluntarily blocks a port of a ring protection link, at this time the master node implements the port state switching operation, switches the state of the corresponding port from the unblocked state to the blocked state, and respectively updates the forwarding database.

Further, the method is applied to a single ring protection system or a multi-ring protection system.

In order to solve the above technical problem, the present invention further provides an Ethernet ring network node, and when the Ethernet ring network node implements a port state switching operation and a port on the ring is switched from an unblocked state to a blocked state, the Ethernet ring network node updates its forwarding database.

Further, the Ethernet ring network node comprises a switching module, a storing module and an updating module, wherein the switching module is configured to implement the port state switching operation, and to notify the updating module if a port on the ring is switched from the unblocked state to the blocked state;

the storing module is configured to store the forwarding database of the Ethernet ring network node; and the updating module is configured to update the forwarding database in the storing module according to the notification of the switching module.

Further, the updating module comprises an eliminating sub-module and a learning sub-module, wherein the eliminating sub-module is configured to eliminate corresponding table item of the forwarding database according to the notification of the switching module;

the learning sub-module is configured to re-learn the address in the corresponding table item that has been cleared up; and the table item that is eliminated and re-learned is the table item of the whole forwarding database, or the table item of the forward database corresponding to the port on the ring, or the table item of the forward database corresponding to the port switched from the unblocked state to the blocked state.

Further, the reason why the switching module switches the port state from the unblocked state to the blocked state is that the port fails, the link fails, or a master node voluntarily blocks a port of a ring protection link.

In the method for updating an address table in an Ethernet ring network node and the Ethernet ring network node provided by the present invention, when the Ethernet ring network node implements a port state switching operation and a port on the ring is switched from an unblocked state to a blocked state, the Ethernet ring network node updates its forwarding database. The present invention enables a ring network protection node to know early that the address table needs to be updated, and then the forwarding database FDB is updated in advance, instead of waiting for the notification from other nodes or through complicated calculation, so that the convergence speed and quality of the switching when the ring network fails are greatly improved, the time for address updating of the whole system is reduced, and the problem is avoided that the addresses of the adjacent nodes of a failed link can not be updated when multiple nodes fail. The present invention can be applied to multiple types of ring network protection technologies.

BRIEF DESCRIPTION OF THE ACCOMPANYING DRAWINGS

PREFERABLE EMBODIMENTS OF THE INVENTION

The method for updating an address table in an Ethernet ring network node according to the present invention is that when the Ethernet ring network node implements a port state switching operation and a port on the ring is switched from an unblocked state to a blocked state, the Ethernet ring network node updates its forwarding database.

Figure 3:
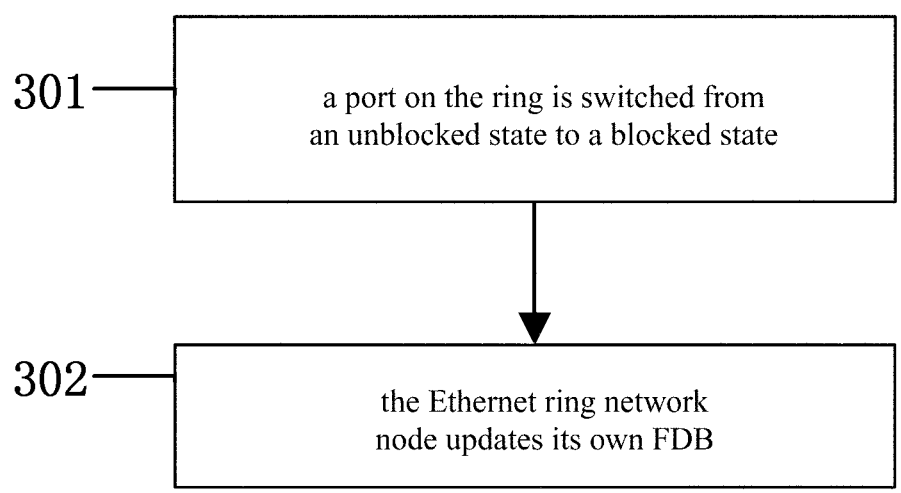
FIG. 3 is a flow chart of the specific embodiment according to the present invention.

As illustrated in FIG. 3, the method for updating an address table in the Ethernet ring network node according to the present invention specifically comprises the following steps:

step 301, the Ethernet ring network node implements a port state switching operation and a port on the ring is switched from an unblocked state to a blocked state, i.e., the following event happens to a port on the ring of the Ethernet ring network protection system node: it is changed from that service communication data originally can be forwarded via the port to that the service communication data can not be forwarded via the port; and step 302, the node needs to update its FDB, wherein the updating comprises firstly clearing-up and then re-learning, and the re-learning and the clearing-up are not successive in time, but can have a certain interval therebetween, for example, when a failure occurs, each node detects the change of the states of data forwarding and firstly clears up the corresponding table item, then the master node unblocks the protection link based on the failure notification, and then each node can re-learn the new address.

Wherein in step 301, the reasons of the event are that a port fails, a link fails, and the master node voluntarily blocks the ring protection link port, and etc.;

when the port fails, the Ethernet ring network node where the failed port is located implements a port state switching operation, and switches the state of the failed port from an unblocked state to a blocked state;

when the link fails, two Ethernet ring network nodes directly connected to each other via the link implement the port state switching operation, and the states of the ports on the ring corresponding to the two Ethernet ring network nodes are changed from the unblocked state to the blocked state; and when the master node voluntarily blocks a port of a ring protection link, the master node implements the port state switching operation, and switches the state of the corresponding port from the unblocked state to the blocked state;

in step 302, the manners that the node updates its FDB may include updating its whole FDB table items, updating the FDB table item corresponding to the port on the ring, updating the FDB table item corresponding to the port in step 301, and etc., i.e., at least updating the FDB table item corresponding to the port in step 301;

in addition, after the event in step 301 occurs, step 302 does not need to be started immediately and some other operations that the ring network protection technologies need may exist therebetween.

The present invention is further explained hereinafter by giving some examples about specific practical applications.

Figure 1A:
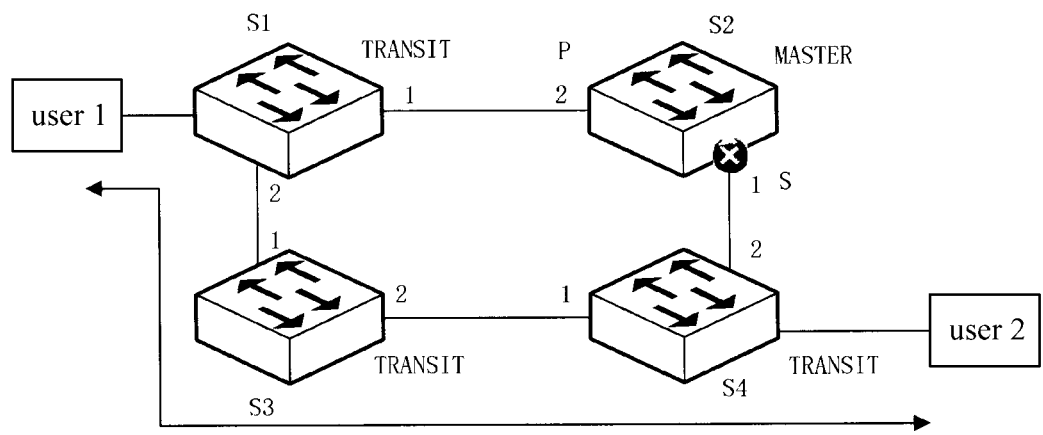
FIG. 1a is a topological view when a link on the RFC3619 ring does not fail.
Figure 1B:
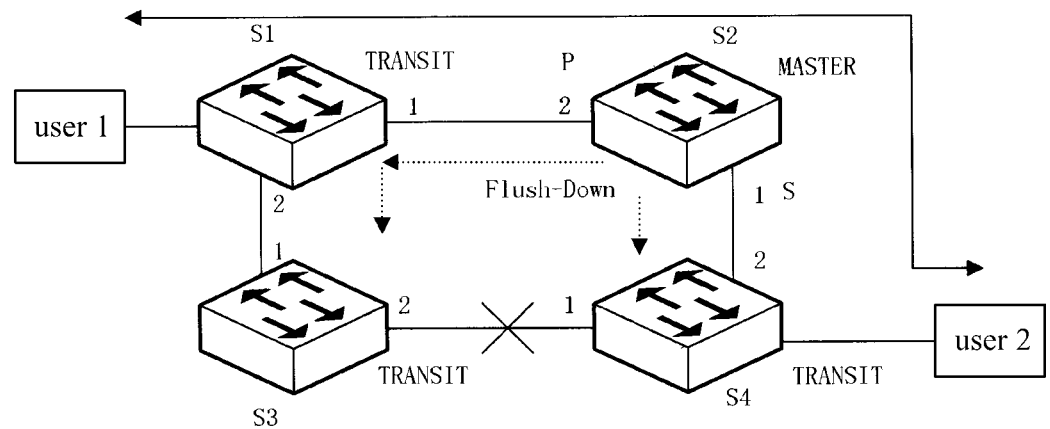
FIG. 1b is a topological view when a link on the RFC3619 ring fails.
Figure 2A:
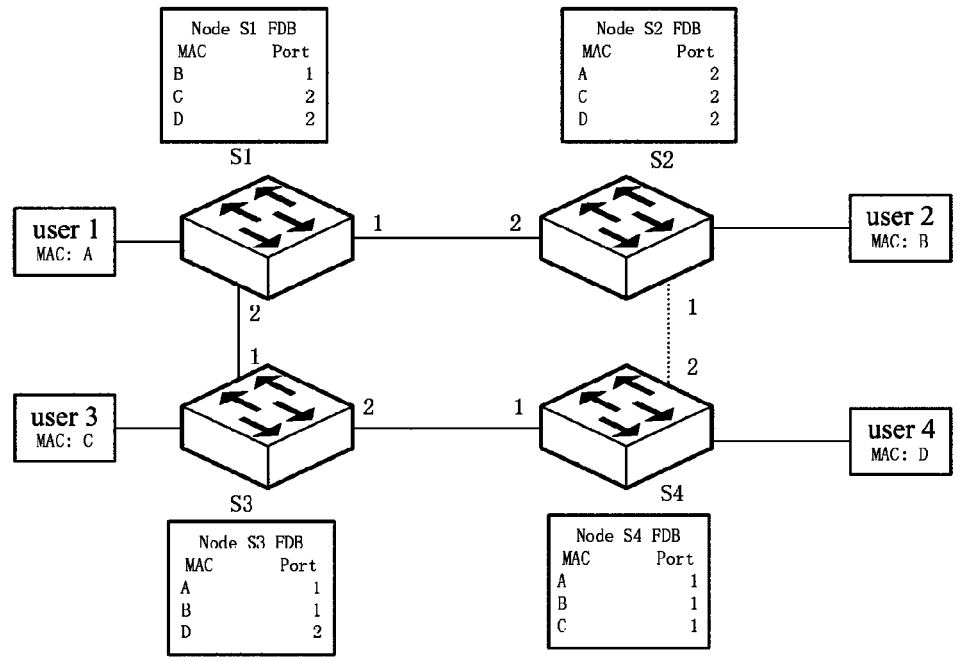
FIG. 2a is a schematic view of the FDB in a node when the link on the ring of the Ethernet ring network protection system has no failures.

As illustrated in FIG. 2a, the ring protection link is the link between nodes S2 and S4; when the links on the ring are all in good condition, the ring protection link is blocked, the users only have one path for communication therebetween, and the FDB table of each node records the egress port of the target MAC address, when communication occurs between the users, the egress port of the data frame can be looked for by searching the FDB of a node, and when the egress port can not be found, the data are broadcasted to each port.

Figure 2B:
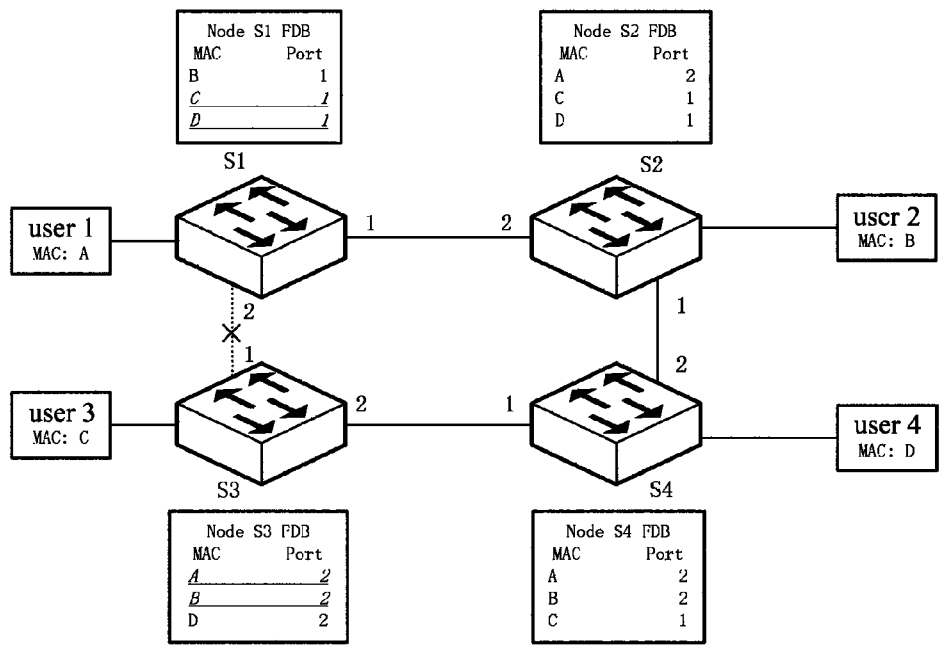
FIG. 2b is a schematic view of the FDB in a node when a failure occurs on a link on the ring of the Ethernet ring network protection system.

As illustrated in FIG. 2b, when the link between nodes S1 and S3 fails, adjacent nodes of the ring protection link are notified to unblock the ring protection link, each node updates the FDB, and users communicate to each other by the new transmission path; port 2 of node S1 can forward the service communication data before a failure occurs, but can not forward the service communication data after a failure occurs, and if the service communication data on node S1 originally forwarded to port 2 are continuously forwarded to port 2, these data will be discarded at failed port 2, and thus the FDB on node S1 has false table item, i.e., the table item corresponding to port 2, and according to the method of the present invention, when implementing the state switching of port 2 from an unblocked state to a blocked state, node S1 knows it needs to update its own FDB, and when updating the FDB, node S1 should at least update the table item corresponding to port 2; similarly, port 1 of node S3 can forward the service communication data before a failure occurs, but can not forward the service communication data after a failure occurs, and if the service communication data on node S3 originally forwarded to port 1 are continuously forwarded to port 1, the data will be discarded at failed port 1, and thus the FDB on node S3 has false table item, i.e., the table item corresponding to port 1, and according to the method of the present invention, port S3 implements the state switching of port 1 from an unblocked state to a blocked state, node S3 knows it needs to update its own FDB, and when updating the FDB, node S3 should at least update the table item corresponding to port 1.

Figure 2C:
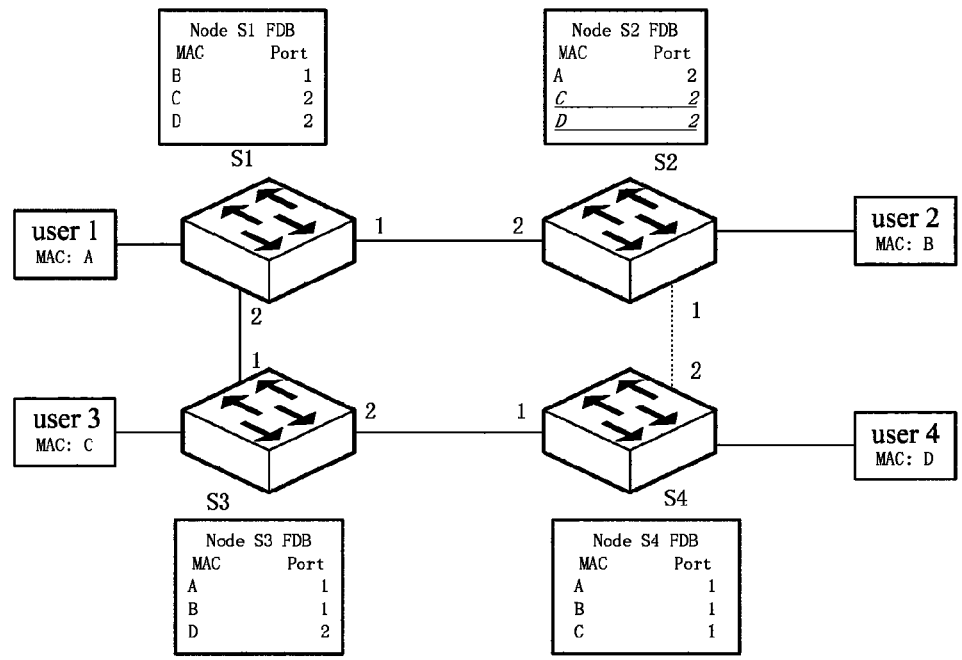
FIG. 2c is a schematic view of the FDB in a node when the link on the ring of the Ethernet ring network protection system recovers from being switched.

When the failure of the link on the ring disappears, the Ethernet ring network re-blocks the ring protection link, unblocks the link on which the failure disappears, then as illustrated in FIG. 2c, when the failure of the link between nodes S1 and S3 disappears, the ring protection link is re-blocked, the failure recovered link is unblocked, each node updates the FDB, and users communicate with each other by the new transmission path, and port 1 of node S2 can forward the service communication data before the switching, but can not forward the service communication data as the port is blocked after the switching, and if the service communication data on node S2 originally forwarded to port 1 is continuously forwarded to port 1, the data will be discarded at blocked port 1, and thus the FDB on node S2 has false table item, i.e., the table item corresponding to port 1, and according to the method of the present invention, node S2 implements the state switching of port 1 from an unblocked state to a blocked state, the node S2 knows it needs to update its own FDB, and when updating the FDB, node S2 should at least update the table item corresponding to port 1.

Figure 2D:
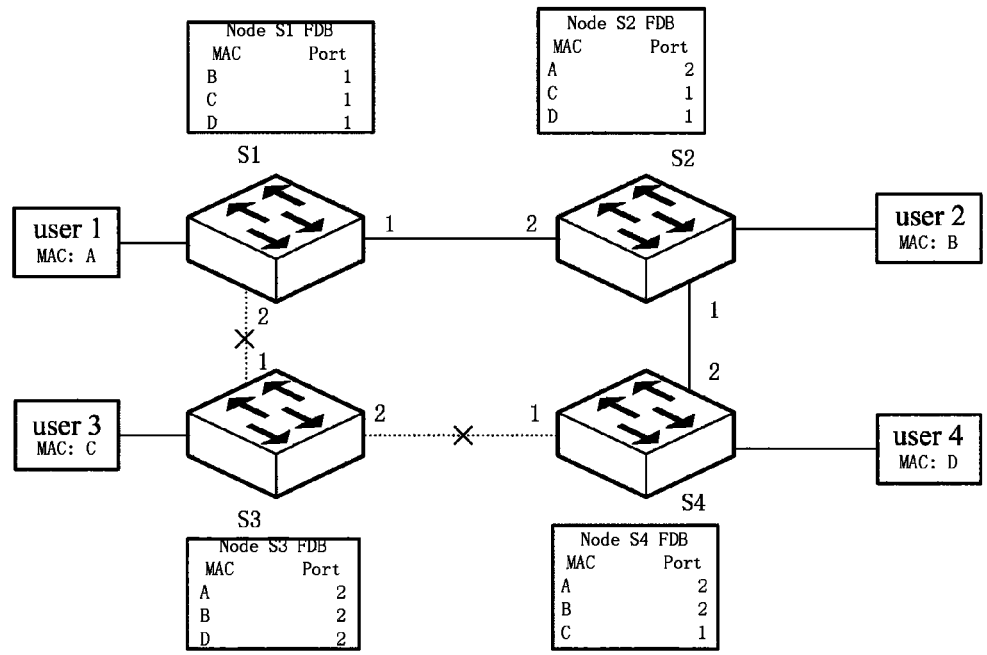
FIG. 2d is a schematic view of the FDB in a node when the Ethernet ring network protection system does not need to update the FDB in the node when a second node of the link on the ring fails.
Figure 2E:
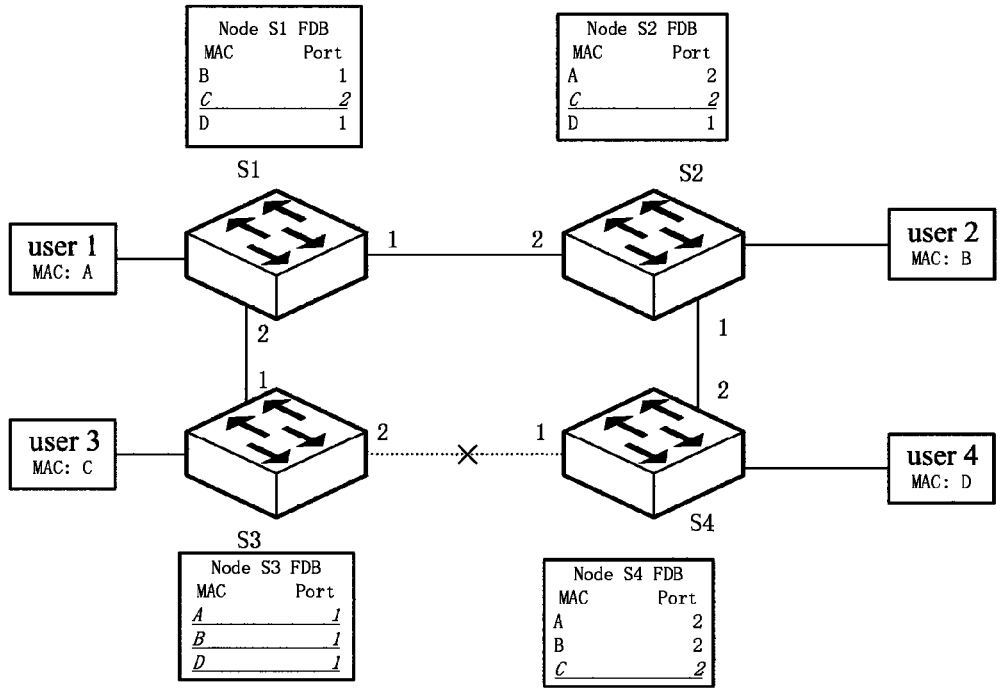
FIG. 2e is a schematic view of a new FDB in a rear node when the failure of the first node of the link on the ring of the Ethernet ring network protection system disappears.

When a failure occurs to a first node on the ring, after the completion of the switching, a further failure occurs to a second node, and in some Ethernet ring network protection technologies, after the failure of the second node occurs, other nodes do not need to update the address, because there will be no new transmission path after the FDB is updated although other nodes have false FDB table items. As illustrated in FIG. 2b, the link between nodes S1 and S3 fails, after the completion of the ring network switching, each node transmits the service communication data by the new transmission path and establishes a new FDB, since the failure occurs only to a node in the single ring, any two nodes in the ring network further have a path that can be used for communication therebetween. When the failure of the second node occurs, as illustrated in FIG. 2d, the link between nodes S3 and S4 fails, since the nodes on the ring are divided into several unconnected parts, no new transmission path will be generated, and each node does not need to update the port address table. If the failure of the first node disappears, as shown in FIG. 2e, the failure of the link between nodes S1 and S3 disappears, the service data communication between the nodes can be transmitted via S1 and S3, a new transmission path occurs, and the nodes need to update the original false FDB. In some ring network protection technologies, in order to prevent the nodes from repeatedly updating the FDB, the nodes do not need to update the FDB in the case of no state change, while the link between nodes S3 and S4 is in a failing state, the states of nodes S3 and S4 will not change, and thus they will not update the FDB due to no state change when notified to update the FDB, which results in that some service communication data at nodes S3 and S4 are forwarded to false ports and cannot be transmitted by the new path. When the link between nodes S3 and S4 fails, according to the method of the present invention, node S3 implements the state switching of port 2 from an unblocked state to a blocked state, node S3 knows it needs to update its own FDB, and when updating the FDB, node S3 at least should update the table item corresponding to port 2; node S4 implements the state switching of port 1 from an unblocked state to a blocked state, node S4 also knows it needs to update its own FDB, and when updating the FDB, node S4 should at least update the table item corresponding to port 1. Hence, according to the method of the present invention, when failures and recoveries of multiple nodes occur and a new transmission path is generated, still, the situation will not appear that adjacent nodes of a failed link will not update its FDB just due to no state change, this situation will result in that the service communication data are forwarded to the false port.

Figure 2F:
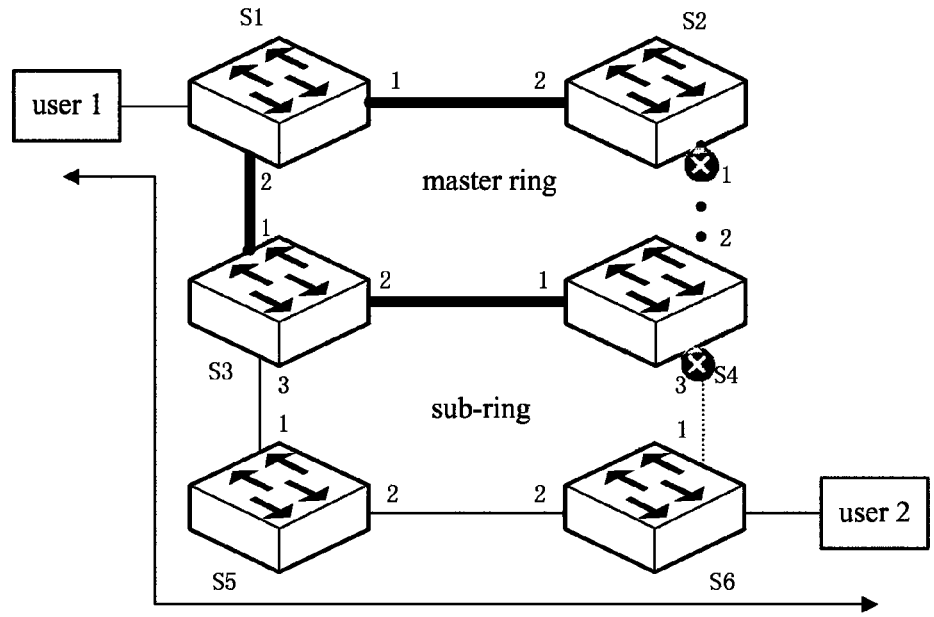
FIG. 2f is a schematic view of a service communication data path when no link on the ring of an Ethernet multi-ring protection system fails.
Figure 2G:
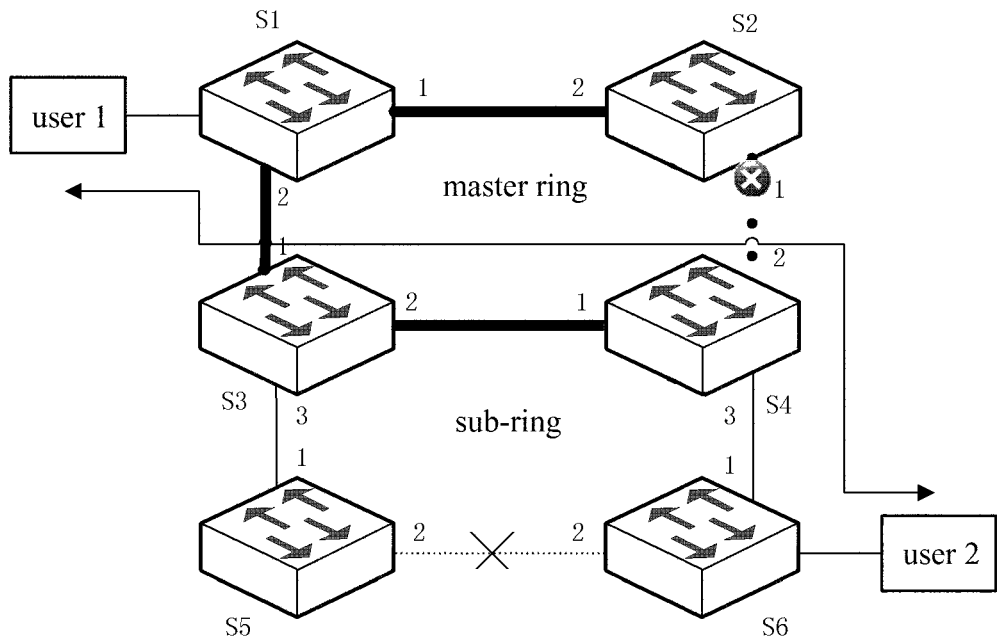
FIG. 2g is a schematic view of the service communication data path when a failure occurs on the link on the ring of the Ethernet multi-ring protection system.

As shown in FIG. 2f, in a multi-ring protection system, when the links on the ring are all in normal condition, the communication path of the service data between user 1 and user 2 is: user 1<->S1<->S3<->S5<->S6<->user 2, and node S6 learns that the address egress port of user 1 is port 2. As illustrated in FIG. 2g, when the link between nodes S3 and S5 fails, when monitoring that the direct connection link of port 2 fails, node S6 implements the port state switching operation and switches port 2 from the unblocked state to the blocked state, that is, from being able to forward the service communication data to being unable to do so, and node S6 updates the FDB in advance, the traffic from user 2 to user 1 will not be forwarded to the original egress port 2 but reaches user 1 by using the form of broadcasting, and each node re-establishes a new FDB, and user 1 and user 2 also have a new service data communication path therebetween: user 1<->S1<->S3<->S4<->S6<->user 2. Node S6 updates the FDB in advance, which accelerates the link switching speed.

To realize the above method, the present invention also provides an Ethernet ring network node, when the Ethernet ring network node implements a port state switching operation and a port on the ring is switched from an unblocked state to a blocked state, the Ethernet ring network node updates its forwarding database.

The Ethernet ring network node comprises a switching module, a storing module and an updating module, wherein
the switching module is configured to implement the port state switching operation, and to notify the updating module if a port on the ring is switched from an unblocked state to a blocked state;
the reason why the switching module switches the state of the port from the unblocked state to the blocked state is that the port fails, the link fails, or a master node voluntarily blocks a port of a ring protection link.

When a port fails, the switching module of the Ethernet ring network node where the failed port is located implements the port state switching operation and switches the state of the port from the unblocked state to the blocked state;
when a link fails, the switching modules of two Ethernet ring network nodes directly connected to each other via the link implement the port state switching operation, and the state of the port on the ring corresponding to them is switched from the unblocked state to the blocked state; and
when the master node voluntarily blocks the port of the ring protection link, the switching module of the master node implements the port state switching operation, and switches the state of the corresponding port on the ring from the unblocked state to the blocked state.

The storing module is configured to store the FDB of the Ethernet ring network node;

the updating module is configured to update the forward database in the storing module according to the notification of the switching module,
the updating module comprises an eliminating sub-module and a learning sub-module;
the eliminating sub-module is configured to eliminate corresponding table item of the forwarding database according to the notification of the switching module; and
the learning sub-module is configured to re-learn the address in the corresponding table item that has been cleared up.

The table item that is eliminated and the re-learning is the table item of the whole forward database, or the table item of the forward database corresponding to the port on the ring, or the table item of the forward database corresponding to the port switched from the unblocked state to the blocked state.

INDUSTRIAL APPLICABILITY

According to the method for updating an address table in the Ethernet ring network node and the Ethernet ring network node provided by the present invention, when the Ethernet ring network node implements the port state switching operation and a port on the ring is switched from the unblocked state to the blocked state, the Ethernet ring network node updates its forward database, and the present invention enables the ring network protection node to acquire the need to update the address table comparatively early and to update the forward database FDB in advance, rather than waiting for the notification of other nodes or requiring complex calculations, so that the convergence speed and the quality of the failure switching of the ring network are greatly improved, and the address updating time of the whole system is reduced, and the problem is avoided that the address of the adjacent nodes of the failed link can not be updated in the case of multiple node failures, and the present invention can be used in multiple kinds of ring network protection technologies.

What is claimed is:

1. A method for updating an address table in a node of an Ethernet ring network, comprising:
the node detecting that the node cannot transmit data through a port of the node; and
in response to the detection:
the node switching a state of the port from an unblocked state to a blocked state;
the node updating its forwarding database to reflect a state change at the port; and
after the node updates its forwarding database to reflect a state change at the port, the node notifying a master node of the Ethernet ring network of the state change at the port of the node, wherein, in response to the state change at the port of the node notified by the node, the master node unblocks a ring, protection link associated with the master node and updates its forwarding database so that other nodes of the Ethernet ring network can update their respective forward databases in response to the unblocking of the ring protection link.

2. The method according to claim 1, wherein the forwarding database of the node is updated in the following manner: firstly clearing up a corresponding table item of the forwarding database, and then re-learning the address in the corresponding table item that has been cleared up.

3. The method according to claim 2, wherein the corresponding table item is all the table items of the forwarding database, or the table item of the forwarding database corresponding to the port on the ring, or the table item of the forwarding database corresponding to the port switched from the unblocked state to the blocked state.

4. The method according to claim 1, wherein the reason why the port is switched from the unblocked state to the blocked state is that the port fails, at this time the node to which the failed port belongs implements the port state switching operation, switches the state of the failed port from the unblocked state to the blocked state and updates the forwarding database.

5. The method according to claim 1, wherein the reason why the port is switched from the unblocked state to the blocked state is that the link fails, at this time two nodes of the Ethernet ring network directly connected with each other via the link implement the port state switching operation, the states of the ports on the ring corresponding to the two nodes are switched from the unblocked state to the blocked state and respectively update the forwarding database.

6. The method according to claim 1, wherein the reason why the port is switched from the unblocked state to the blocked state is that the master node voluntarily blocks a port of the ring protection link, at this time the master node implements the port state switching operation, switches the state of the corresponding port from the unblocked state to the blocked state, and respectively updates the forwarding database.

7. The method according to claim 1, wherein the method is applied to a multi-ring protection system.

8. A node of an Ethernet ring network, wherein the node is configured to:
   detect that the node cannot transmit data through a port of the node; and
   in response to the detection;
      switch a state of the port from an unblocked state to a blocked state;
      update its forwarding database to reflect a state change at the port; and
      after the node updates its forwarding database to reflect a state change at the port, notify a master node of the Ethernet ring network of the state change at the port of the node, wherein, in response to the state change at the port of the node notified by the node, the master node unblocks a ring protection link associated with the master node and updates its forwarding database so that other nodes of the Ethernet ring network can update their respective forward databases in response to the unblocking of the ring protection link.

9. The node according to claim 8, wherein the node comprises a switching module, a storing module and an updating module, wherein the switching module is configured to implement the port state switching operation, and to notify the updating module if a port on the ring is switched from the unblocked state to the blocked state; the storing module is configured to store the forwarding database of the node; and the updating module is configured to update the forwarding database in the storing module according to the notification of the switching module.

10. The node according to claim 9, wherein the updating module comprises an eliminating sub-module and a learning sub-module, wherein the eliminating sub-module is configured to eliminate corresponding table item of the forwarding database according to the notification of the switching module; the learning sub-module is configured to re-learn the address in the corresponding table item that has been cleared up; and the table item that is eliminated and re-learned is the table item of the whole forwarding database, or the table item of the forward database corresponding to the port on the ring, or the table item of the forward database corresponding to the port switched from the unblocked state to the blocked state.

11. The node according to claim 8, wherein the reason why the switching module switches the state of the port from the unblocked state to the blocked state is that the port fails, the link fails, or a master node voluntarily blocks a port of a ring protection link.

12. The method according to claim 1, further comprising:
   while the port of the node is in the blocked state, the node broadcasting data to the other nodes of the Ethernet ring network.

13. The method according to claim 1, further comprising:
while the port of the node is in the blocked state;
   a second node detecting that the second node cannot transmit data through a port of the second node; and
   in response to the detection;
      the second node switching a state of the port of the second node from an unblocked state to a blocked state; and
      the second node updating its forwarding database to reflect a state change at the port of the second node.

14. The method according to claim 13, wherein, in response to that the port of the node is switched back to the blocked state to the unblocked state, the second node updates its forwarding database to reflect a state change at the port of the node while the port of the second node remains in a blocked state.

* * * * *